June 13, 1972 B. G. BAGLEY ET AL 3,669,643

METHOD FOR THE PREPARATION OF SMALL COBALT PARTICLES

Filed May 5, 1970

INVENTORS B. G. BAGLEY
J. N. CARIDES
BY
ATTORNEY

United States Patent Office 3,669,643

Patented June 13, 1972

3,669,643

METHOD FOR THE PREPARATION OF SMALL COBALT PARTICLES

Brian G. Bagley, Watchung, and James Nicholas Carides, Bernardsville, N.J., assignors to Bell Telephone Laboratories, Incorporated, Murray Hill, N.J.

Filed May 5, 1970, Ser. No. 34,680
Int. Cl. H01f *1/20*
U.S. Cl. 75—.5 AA 9 Claims

ABSTRACT OF THE DISCLOSURE

Fine particles of magnetic materials are the basic operational constituents of devices such as permanent magnets and magnetic recording tapes. The use of fine cobalt particles for such devices has been limited by the difficulty of producing such particles with the magnetically more desirable hexagonal crystal structure. The disclosure here contemplates the production of fine particles containing hexagonal metallic cobalt by a simple and potentially economic process involving precipitation from solution by a strong reducing agent. This process can be successfully performed if the solution contains minor quantities of ions of Cr, Pt, As, Ca, Ge and/or Ta in addition to cobalt ions.

BACKGROUND OF THE INVENTION

(1) Field of the invention

The invention disclosed here contemplates the production and use of fine particles of magnetic materials.

(2) Description of the prior art

There are currently in manufacture many devices incorporating fine particles of magnetic materials. Magnetic recording tapes and permanent magnets are but two of these. Typically these devices incorporate the fine particles within a nonmagnetic matrix. The improved magnetic characteristics of these devices depend upon both the size of the particles and their magnetic anisotropy, the magnetic anisotropy being of two major types—shape anisotropy and magnetocrystalline anisotropy. A potentially inexpensive way of producing fine particles is the precipitation from solution where ions of the magnetic material are reduced by a chemical reducing agent. For this, strong reducing agents such as the borohydrides have proven to be useful. Using the borohydrides fine particles of iron and iron-cobalt solid solutions down to a one-to-one ratio have been formed (Journal of Applied Physics 32 (1961), 184S). These materials were formed in a magnetic field reportedly in order to produce needle shaped particles and supply a magnetic shape anisotropy. When the same process is attempted using only cobalt which, in its hexagonal phase possesses a strong uniaxial magnetocrystalline anisotropy, cobalt borides are formed. It has proven difficult by any means to produce fine particles of elemental cobalt in its hexagonal phase, the multiaxial cubic phase being ordinarily produced.

SUMMARY OF THE INVENTION

It has been found that the addition of Cr, Pt, As, Ca, Ge and/or Ta ions to a solution meant for the production of cobalt particles leads to the precipitation of particles of elemental cobalt in its hexagonal phase. The hexagonal phase is more desirable for many device uses than the cubic phase because of its uniaxial magnetocrystalline anisotropy. Fine particles of this material could be used to great advantage in such devices as magnetic recording tapes and permanent magnets. For magnetic recording tapes they have a particular advantage of being physically much softer than presently used oxide particles. Such tapes could produce much less wear on magnetic recording heads.

DETAILED DESCRIPTION OF THE INVENTION

Constituents

Figure 1:
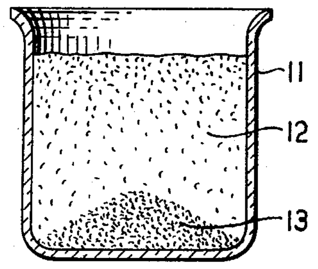
FIG. 1 is a perspective view of a beaker containing a solution of the disclosed composition, from which hexagonal cobalt particles are precipitating.

There are a number of constituents which must be present in the solution 12 (see FIG. 1) in order to cause the precipitation of particles 13 containing elemental hexagonal cobalt rather than cubic cobalt or cobalt compounds. A number of other constituents may be introduced in order to moderate the chemical reaction according to principles well known in the art. The first of the essential constituents are, of course, the cobalt ions which can be introduced into the solution as any of the soluble cobalt salts in a concentration sufficient to provide the desired cobalt particle production. In order to chemically reduce these ions, according to the disclosed invention, there must be present ions of a strong reducing agent. The concentration of these ions is not critical. Low concentrations will produce an incomplete reaction leaving some cobalt ions in the solution. Overabundance will leave unreacted reducing agent ions in the solution after completion of the chemical reaction. Among the reducing agents which may advantageously be used for this purpose are the borohydrides, the hypophosphites, hydrazine and hydrogen.

According to the disclosed invention there must also be present ions selected from the group Cr, Pt, As, Ca, Ge and/or Ta in a concentration greater than a total of 0.2 ion percent of the concentration of the cobalt ions. These ions may be present in concentrations of as much as several ion percent with little alteration of the product particles.

Product particles

Without the addition of ions selected from the disclosed group, the borohydride reduction of cobalt ions produces particles of various cobalt borides. In a strongly basic solution $Co_3B$ is produced whereas in less basic or acidic solutions the compound $Co_2B$ is produced. The presence of these compounds is clearly shown by X-ray analysis. With the addition of ions selected from the disclosed group, particles containing elemental cobalt in its hexagonal phase are produced. Chemical analysis shows the presence of the element boron typically in a concentration of between 5 and 8 weight percent. However, X-ray analysis show that this boron is present principally in its elemental form. It is possibly interstitial in the cobalt lattice.

In addition chemical analysis shows that a portion of the additionally included ions is also present in the precipitated particles. Typically, the additional ions are reduced from the solution in roughly the same proportion as their concentration in solution and are, to that extent, included in the precipitated particles. This property can be made use of if dilute alloys including these elements are desired.

The particles produced by the exemplary procedure, presented below, range in size from approximately 250 A. to one micron. It is well understood by those in the art that in a precipitation reaction, such as disclosed here, the particles size is somewhat dependent upon the reaction rate. Faster reaction rates tend to produce finer particles.

Figure 2:
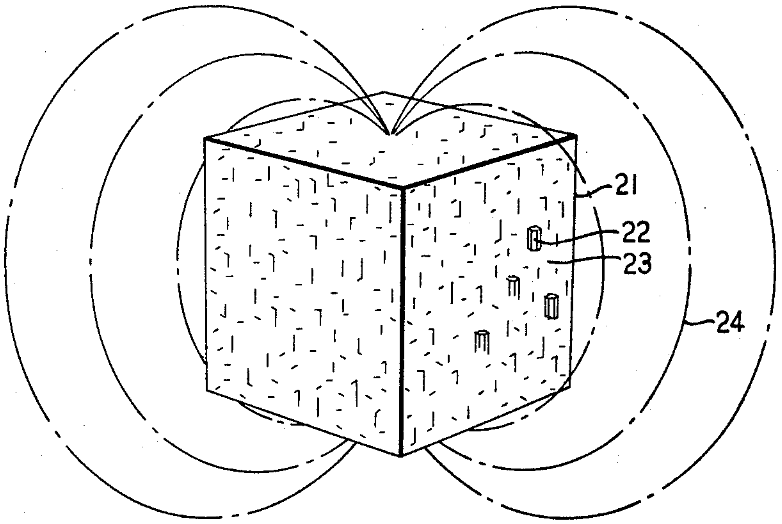
FIG. 2 is a perspective view of a permanent magnet composed of hexagonal cobalt particles in a nonmagnetic matrix.

It has been found that heat treatment at temperatues between 200° C. and 500° C. has a favorable effect on the device properties of the precipitated particles. Powders which possessed a saturation magnetization of the order of 50 e.m.u. per gram showed an increase to of the order of 100 e.m.u. per gram after heat treatment. (The saturation magnetization of pure metallic cobalt is 161 e.m.u. per gram.) The coercivity of these powders was also increased from of the order of 100 to 200 oersteds to of the order of 600 to 1000 oersteds. The precipitates which are produced can be processed as a slurry or they can be dried before device usage usually entailing incorporation in a nonmagnetic matrix. FIG. 2 shows a block 21 of permanent magnet material composed of precipitated particles 22 within a nonmagnetic matrix 23. Some magnetic field lines 24 are illustrated to show the state of magnetization.

Conditions

The major conditions which can be used to control the rate of the chemical reaction are the temperature of the solution and its pH. The reaction is exothermic and it proceeds spontaneously becoming progressively warmer if heat is not removed. If the temperature is not controlled, the reaction will become more and more rapid until it proceeds to completion. The speed or temperature of the reaction has no discernible effect on the constitution of the precipitated particles. The reaction rate can be moderated by controlling the temperature of the solution or by making the solution basic. The latter can be accomplished, for instance, with the addition of ammonium hydroxide. If a borohydride is used as the reducing agent, the addition of ammonium hydroxide also tends to decrease the amount of elemental boron included in the precipitated particles.

EXEMPLARY PROCEDURE

An exemplary procedure using a concentration of additional ions near the low end of the disclosed concentration range is as follows: 150 ml. of 0.5 M $CoCl_2 \cdot 6H_2O$ and 150 ml. of 1.5 M $NaBH_4$ (sodium borohydride) are freshly prepared. To the cobalt solution add 3 ml. of 5 percent PtCl solution (0.4 ion percent of the cobalt ion concentration). Additionally add 300 ml. of fresh $NH_4OH$. Then add the $NaBH_4$ solution. When the $NH_4OH$ is first added to the salt solution, a precipitate appears, but as more of this base is added the precipitate goes back into solution. The $NaBH_4$ solution is then added. $H_2$ is evolved The process is exothermic. If no attempt is made to control the temperature, after about 20 minutes the reaction is complete. The precipitate is then rinsed several times in distilled $H_2O$. The bulk of the water can be removed by centrifuging and the sample drying completed in a vacuum desiccator. Because of the pyrophoricity of the product, the vacuum is broken slowly and carefully, rendering the particles stable in air. The product is about 2 grams of strongly magnetic fine particle hexagonal cobalt.

Material produced by this procedure was magnetically tested and found to possess a saturation magnetization of 51.5 e.m.u. per gram and a coercivity of 100 oersteds. After heat treatment for 14 days at 300° C. the saturation magnetization was 113 e.m.u. per gram and the coercivity was 1000 oersteds.

Illustrative of additional ion inclusions toward the other end of the concentration range is the addition of 1 gram of $CrCl_3 \cdot 6H_2O$ in place of the PtCl solution above. This corresponds to 5 ion percent of the cobalt ions. Such a process resulted in powders with a saturation magnetization of 49.5 e.m.u. per gram and a coercivity of 200 oersteds. After heat treatment for 14 days at 300° C. the saturation magnetization was 98 e.m.u. per gram and the coercivity was 600 oersteds. These results are merely illustrative and the magnetic differences represent an experimental data spread and not a systematic trend.

What is claimed is:

1. Method for the production of a body comprising fine particles containing cobalt by the chemical reduction of cobalt ions in solution by ions of a reducing agent capable of reducing said cobalt ions in said solution with the subsequent precipitation of the reaction product characterized in that said solution also contains additional ions of at least one species selected from the group consisting of Cr, Pt, As, Ca, Ge and Ta in a concentration of at least 0.2 ion percent of the concentration of said cobalt ions, said reducing agent being also capable of reducing said additional ions, said cobalt being essentially metallic cobalt in its hexagonal crystal phase.

2. Method of claim 1 in which said fine particles are separated from said aqueous solution.

3. Method of claim 2 in which said fine particles are heat treated for a time greater than one hour at temperature greater than 200° C. and less than 500° C.

4. Method of claim 1 in which said reducing agent is one member selected from the group consisting of hydrogen, a water soluble hypophosphite, hydrazine and a water soluble borohydride.

5. Method of claim 4 in which said reducing agent is sodium borohydride.

6. Method of claim 5 in which said additional ion is ionic chromium.

7. Method of claim 5 in which said additional ion is ionic platinum.

8. Method of claim 1 in which said body consists essentially of said fine particles.

9. Method of claim 1 in which said body comprises said fine particles embedded in a nonmagnetic matrix.

References Cited

UNITED STATES PATENTS

| | | | |
|---|---|---|---|
| 3,494,760 | 2/1970 | Ginder | 75—108 X |
| 3,407,126 | 10/1968 | Koretzky | 75—170 X |
| 3,186,829 | 6/1065 | Landgraf | 75—119 X |
| 3,535,104 | 10/1970 | Little, Jr. et al. | 75—0.5 AA |
| 3,567,525 | 3/1971 | Graham et al. | 75—0.5 AA |
| 2,942,990 | 6/1960 | Sullivan | 106—1 |
| 2,671,712 | 3/1954 | De Merre | 75—119 X |

OTHER REFERENCES

Judge et al., Preparation of High-Coercivity Particles, IBM Technical Disclosure, vol. 9, No. 3, August 1966.

Speliotis, D. E., Magnetic Recording Materials, Journal of Applied Physics, vol. 38, No. 3, March 1967, pp. 1207–1214.

L. DEWAYNE RUTLEDGE, Primary Examiner

G. K. WHITE, Assistant Examiner

U.S. Cl. X.R.

75—108, 119; 148—105